United States Patent [19]
Kraus

[11] 3,712,435
[45] Jan. 23, 1973

[54] CLUTCH ASSEMBLY
[75] Inventor: Helmut Kraus, Schweinfurt am Main, Germany
[73] Assignee: Fichtel & Sachs AG, Schiveinfurt am Main, Germany
[22] Filed: Aug. 16, 1971
[21] Appl. No.: 172,016

[30] Foreign Application Priority Data

Aug. 27, 1970 Germany..................P 20 42 419.5

[52] U.S. Cl. ............192/70.27, 192/89 B, 192/113 A
[51] Int. Cl............................................F16d 13/50
[58] Field of Search ...192/70.27, 70.28, 70.29, 89 B, 192/113 A

[56] References Cited

UNITED STATES PATENTS

| 2,770,341 | 11/1956 | Wobrock | 192/70.27 X |
|---|---|---|---|
| 2,870,893 | 1/1959 | Palm | 192/113 A |
| 2,885,047 | 5/1959 | Kehrl | 192/113 A X |
| 3,489,256 | 1/1970 | Binder et al. | 192/89 B X |

Primary Examiner—Allen D. Herrmann
Attorney—Kelman and Berman

[57] ABSTRACT

A clutch assembly for use in a friction clutch for a heavy truck has an annular pressure plate of approximately U-shaped axial cross section, a web of the plate carrying a contact face for engagement with a driven clutch disc, and two annular, radially spaced flanges extending in a rearward axial direction from the web. The radially inner flange has a greater axial height than the outer flange and engages a diaphragm spring whose outer circumference abuts against the clutch housing, while the radially slotted innermost portion may be engaged by a clutch release bearing. The pressure plate is suspended coaxially in the housing by means of leaf springs tangential relative to a circle about the clutch axis, and excessive axial stresses in the several springs are avoided by abutments on the housing engaging lugs on the pressure plate.

10 Claims, 5 Drawing Figures

CLUTCH ASSEMBLY

This invention relates to automotive friction clutches, and particularly to a clutch assembly provided with an improved pressure plate.

It is common practice to install certain elements of an automotive friction clutch as a pre-assembled unit, the assembly mainly consisting of the clutch housing, the pressure plate, the clutch spring or springs, and the elements which secure the pressure plate to the clutch housing for joint rotation about the clutch axis while permitting limited axial movement as is necessary for engaging and disengaging the clutch. Provisions are made on the clutch housing for fixedly mounting the same on the flywheel of an internal combustion engine or an analogous driving member which closes an axially open side of the housing in the fully assembled condition of the clutch, so that a driven clutch disc may be turned by simultaneous axial engagement with respective contact faces of the driving member and of the pressure plate.

Conventional pressure plates for passenger vehicles and light trucks are rings of approximately rectangular cross section, usually of greater radial width than axial height. Such rings cannot be adapted for use in heavy trucks by merely increasing their dimensions in accordance with the higher torque to be transmitted. Installing such a large and heavy pressure plate is difficult, and it cannot readily be operated in the conventional manner. The mass and weight of the enlarged ring generate centrifugal and other forces which increase at a more than linear rate with the size of the ring.

The object of the invention is the provision of a pressure plate which may be made of any practical diameter, yet is relatively low in weight and mass while satisfying all requirements for strength and ease of operation.

With this object and others in view, as will presently become apparent, the invention provides an otherwise conventional clutch assembly including a diaphragm spring, and tangentially elongated spring members with a pressure plate suspended from the clutch housing by the elongated spring members and having an approximately U-shaped cross section in an axial plane. A web portion of the pressure plate has an annular, radial contact face for engagement with the driven clutch disc, the contact face being directed toward the open side in the clutch housing which is closed by a radial face of a flywheel or other drive member in the installed condition of the clutch assembly.

First and second annular flange portions of the pressure plate extend from the web portion in a direction axially away from the open side of the housing. The first flange portion is radially offset from the second flange portion in a radially outward direction, and the web portion and flange portions jointly constitute an annular channel which is open in an axial direction away from the open side of the housing. Plate-shaped ribs extend in the channel in circumferentially offset relationship and radially connect the flange portions.

Other features, additional objects, and many of the attendant advantages of this invention will readily be appreciated as the same becomes better understood from the following description of a preferred embodiment when considered in connection with the appended drawing in which.

Figure 1:
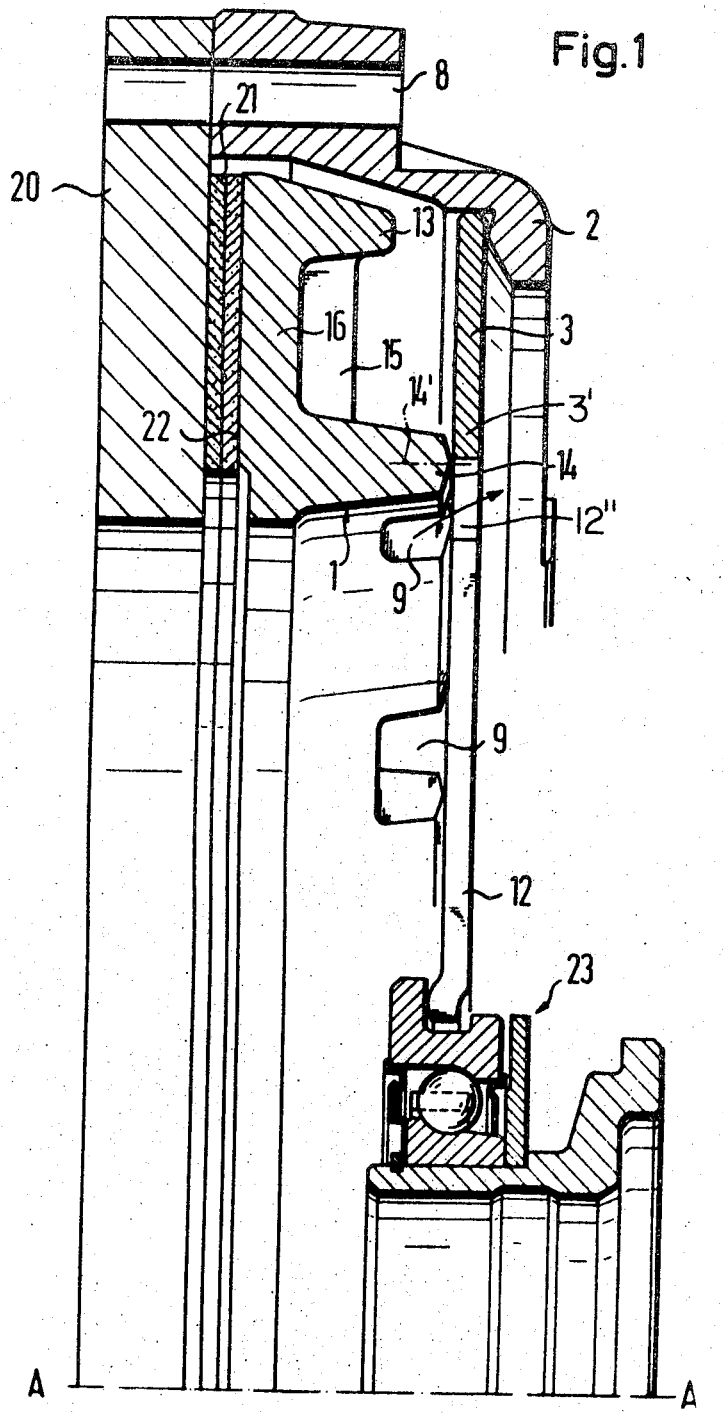
FIG. 1 shows a clutch assembly of the invention and associated parts of a heavy truck in fragmentary, side-elevational section through the clutch axis.

Referring initially to FIG. 1, there is shown only as much of a friction clutch for a heavy truck and of operatively associated elements as is necessary for generally locating the clutch assembly of the invention, some elements of the assembly having been omitted from FIG. 1.

The annular pressure plate 1, with which this invention is more particularly concerned, is coaxially suspended in a cavity bounded by a clutch housing 2 as will be described herein-below so that the pressure plate rotates jointly with the housing, but may move axially to a limited extend. It is biased axially toward the open front side of the housing 2 by a diaphragm spring 3 whose outer circumference abuts axially against the inner housing wall while a radially intermediate engagement portion of the spring 3 pivotally engages the pressure plate 1.

Axial bores 8 in heavy lugs radially projecting from the circumference of the housing 2 outside its cavity receive nonillustrated screws which fasten the housing to the flywheel 20 of the truck engine, not otherwise shown, so that the radial rear face of the flywheel bounds the open front side of the housing 2. In the engaged clutch position illustrated in FIG. 1, a driven clutch disc 21 is engaged between the flywheel 20 and a radial contact face 22 of the pressure plate under the pressure of the spring 3. The central portion of the spring 3 is radially slotted to form radially elongated tongs 12 engaged by a clutch release bearing 23.

The structure described so far is conventional and operates in a known manner. When the release bearing is moved axially rearward or to the right, as viewed in FIG. 1, the pressure plate 1 is relieved of spring pressure, and driving torque is no longer transmitted from the flywheel 20 and the jointly rotating pressure plate 1 to the driven disc 21.

The annular pressure plate 1 differs from known pressure plates in having an approximately U-shaped cross section over almost its entire circumferential length. A radial web 16 of the pressure plate is bounded in a forward direction, that is, toward the open side of the housing 2, by the afore-mentioned contact face 22 of the pressure plate. Two coaxially annular flanges 13, 14 project from the web 16 in radially offset relationship, the radially outer first flange 13 having an axial height smaller than that of the second or radially inner flange 14. The edge part 14' of the second flange 14 which axially projects beyond the first flange 13 makes contact with an engagement portion of 3' of spring 3. Plate-shaped ribs 15 are received in the channel constituted by the web 16 and the flanges 13, 14 and are equiangularly spaced about the clutch axis, only a single rib 15 being seen in FIG. 1. The ribs 15 radially connect the flanges 13, 14 with each other and have an axial height equal to that of the first flange 13. The edge part 14' of the second flange 14 is provided with axial notches 9.

Figure 2:
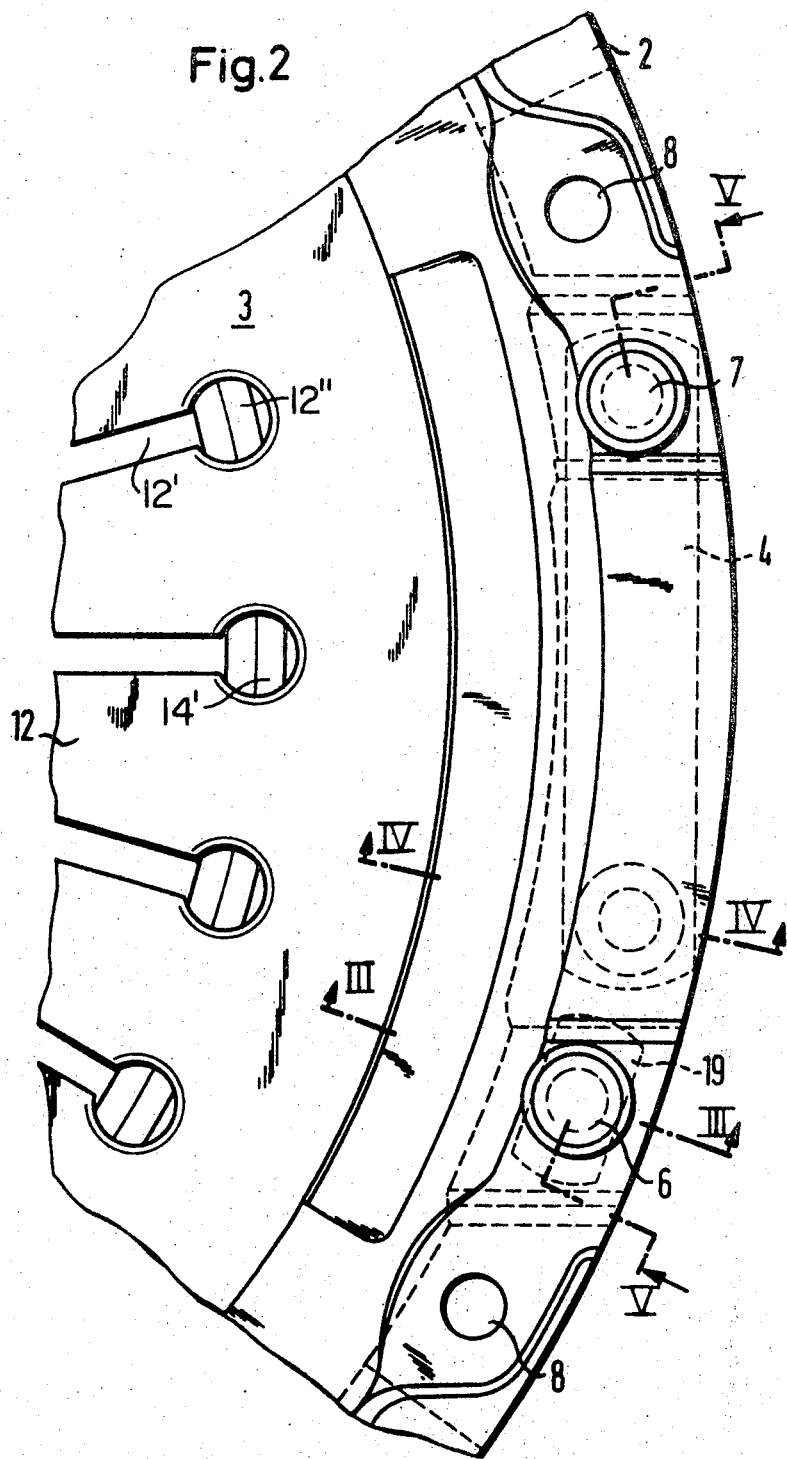
FIG. 2 shows the assembly of FIG. 1 in fragmentary rear elevation.
Figure 3:
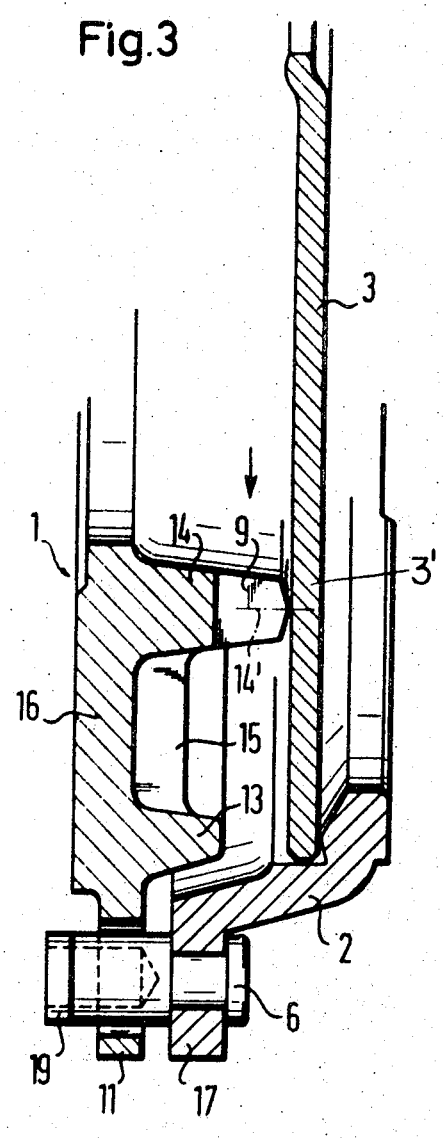
FIGS. 3 to 5 are sections of the assembly respectively taken on the lines III—III, IV—IV, and V—V in FIG. 2.
Figure 4:
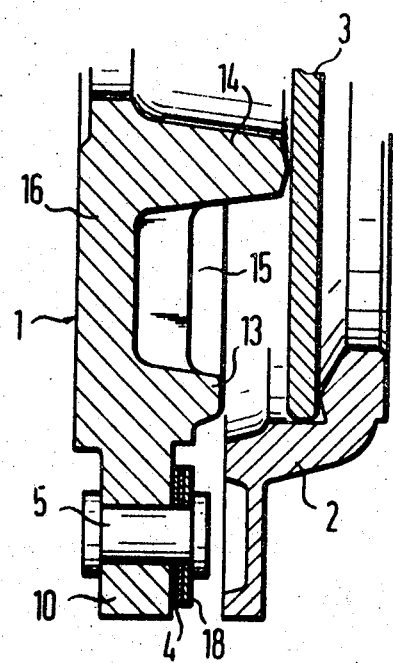
Figure 5:
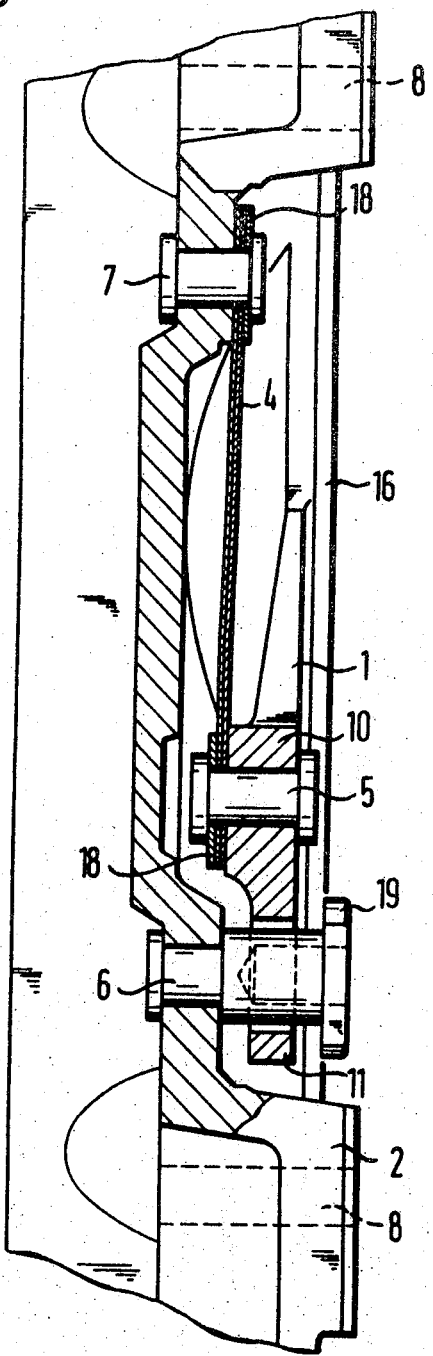

As is shown in more detail in FIGS. 2 to 5, the pressure plate 1 is fastened to the housing 2 in the cavity of the latter by leaf springs 4. The springs 4 are elongated tangentially relative to a common circle about the clutch axis. As is best seen in FIGS. 4 and 5, lugs 10 project radially from the pressure plate 1 beyond the outer flange 13, and one end of each spring 4 is fastened to an associated lug 10 by means of a rivet 5 and a washer 18. The other end of the spring 4 is attached to the inner face of the housing 2 by a rivet 7 and a washer 18 in an analogous manner.

The springs 4 are stressed in tension when transmitting rotary motion from the housing 2 to the pressure plate 1, and may be flexed to permit axial movement of the pressure plate 1. To avoid permanent deformation of the springs, the axial movement of the pressure plate 1 is limited by abutment arrangements, each consisting of a shoulder rivet 6 fixedly fastened to a radial flange portion 17 of the housing 2, passing axially through an oversized bore in an axially reduced portion 11 of a lug 10, and carrying an abutment plate 19 on its free end on the far side of the lug portion 11 (FIGS. 3 and 5).

As is seen in FIG. 2, the radial slots 12' between the tongs 12 of the spring 3 terminate in circularly enlarged apertures 12 of the spring 3 which are axially aligned with the edge part 14' of the flange 14 so that the edge part 14' is exposed through the apertures in an axially rearward direction.

The pressure plate 1 is a unitary metallic structure, preferably a casting of high-strength aluminum alloy or other metal of relatively high heat conductivity. Because of the unitary connection between the web 16, the flanges 13, 14, and the ribs 15, the heat of friction generated at the contact face 22, or transmitted through the contact face 22 from the driven clutch disc, is rapidly distributed in the entire pressure plate 1 and dissipated in the ambient air through the large exposed surface of the pressure plate 1.

The ribs 15 not only contribute to the rigidity of the pressure plate 1, they also act as vanes which impart rapid rotary motion to the air within the housing 2, so that the air is driven out of the housing cavity through the axial gap between the pressure plate 1 and the housing 2 by centrifugal forces (see FIG. 4). Circulation of the moving air is facilitated by the notches 9 in the edge part 14' of the flange 14 which permit a body of air to be radially released from the pressure plate 1 as indicated by an arrow in FIG. 3. The edge part 14' also tends to deflect air into the enlarged end portions 12'' of the slots 12' as indicated by an arrow in FIG. 1.

The mechanical strength of the pressure plate of the invention is almost equal to that of a solid ring having the same overall dimensions, yet its weight is much smaller, a fact whose importance increases with the diameter of the clutch, and is particularly great in clutches for heavy trucks. Large pressure plates of the invention do not tend to be distorted under thermal stress during heavy duty operation.

Prior to installation in a vehicle, the clutch assembly of the invention consists essentially of the housing 2, the pressure plate 1, the connecting leaf springs 4, and the spring 3, and distortion of the springs 3, 4 is prevented by the abutment plates 19 on the shoulder rivets 6. The plates 19 are not normally operative in the installed clutch, but are again important in preventing damage to the assembly when the latter is to be withdrawn from the vehicle for maintenance or repair work.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

In addition to the structure on page 7 of the specification relating to the metallic structure of the pressure plate 1 it is to be noted that in accordance with another prefered embodiment the pressure plate is a casting of high test gray iron.

What is claimed is:

1. In a clutch assembly including a housing having an axis and bounding a cavity open in one axial direction, fastening means for fastening said housing to a face of a drive member in a position in which said face is transverse to said axis and substantially closes the axially open side of said cavity, an annular pressure plate in said cavity, a plurality of elongated spring members, respective longitudinal end portions of each spring member being secured to said housing and to said pressure plate while the spring member is elongated substantially tangentially relative to a circle about said axis, and a diaphragm spring in said cavity having an outer circumference abuttingly engaging said housing and an engagement portion extending about said axis, said engagement portion being offset radially inward from said circumference and engaging said pressure plate, the improvement in said pressure plate which comprises:
   a. a web portion of said pressure plate having an annular radial contact face directed toward said open side;
   b. a first annular flange portion and a second annular flange portion of said pressure plate radially bounding said web portion and extending therefrom axially away from said open side,
      1. said first flange portion being radially offset from the second flange portion in a radially outward direction,
      2. said web portion and said flange portions jointly constituting an annular channel of U-shaped cross section open in an axial direction away from said open side; and
   c. a plurality of ribs extending in said channel in angularly offset relationship relative to said axis and radially connecting said flange portions.

2. In an assembly as set forth in claim 1, said second flange portion having a free edge part remote from said web portion and engaging said engagement portion of the diaphragm spring.

3. In an assembly as set forth in claim 2, said edge part being formed with axial notches therein.

4. In an assembly as set forth in claim 1, said pressure plate including a plurality of apertured fastening lugs projecting radially outward beyond said first flange portion in circumferentially spaced relationship, and securing means securing longitudinal end portions of respective spring members to said lugs.

5. In an assembly as set forth in claim 1, limiting means on said housing for limiting axial movement of said pressure plate toward said open side.

6. In an assembly as set forth in claim 5, said limiting means including a plurality of lugs projecting radially outward from said first flange portion, and abutment means fastened to said housing for abutting engagement with said lugs.

7. In an assembly as set forth in claim 1, said flange portions, said web portion, and said ribs jointly constituting a unitary body of metal having high thermal conductivity.

8. In an assembly as set forth in claim 1, said second flange portion having a free edge part remote from said web portion, said edge part axially projecting beyond said first flange portion and engaging said engagement portion of the diaphragm spring.

9. In an assembly as set forth in claim 8, said edge part being formed with axial notches therein for radial flow of air between said edge part and said diaphragm spring, and said diaphragm spring being formed with apertures, respective portions of said edge part being exposed in an axial direction away from said open side through said apertures in the diaphragm spring.

10. A pressure plate for use in a friction clutch, said pressure plate having an axis, and comprising;
A. a web portion having an annular, radial, contact face exposed in an axial direction;
B. two annular flange portions coaxially extending from said web portion in a direction opposite to said axial direction,
  1. a first flange portion being radially offset from the second flange portion in a radially outward direction,
  2. said second flange portion having an axial height greater than the axial height of said first flange portion,
  3. said web portion and said flange portions jointly constituting an annular channel of U-shaped cross section open in an axial direction away from said contact face; and
C. a plurality of plate-shaped ribs extending in said channel in angularly offset relationship relative to said axis and radially connecting said flange portions,
  1. said web portion, said flange portions, and said ribs jointly constituting a unitary body of metal having high thermal conductivity.

* * * * *